United States Patent
Duncan

(10) Patent No.: US 6,585,215 B2
(45) Date of Patent: *Jul. 1, 2003

(54) ADJUSTABLE HEIGHT SEAT SUPPORT WITH SUSPENSION

(75) Inventor: Allen Duncan, Radford, VA (US)

(73) Assignee: Allen Gary Duncan, Radford, VA (US)

( * ) Notice: Subject to any disclaimer, the term of this patent is extended or adjusted under 35 U.S.C. 154(b) by 16 days.

This patent is subject to a terminal disclaimer.

(21) Appl. No.: 09/825,573

(22) Filed: Apr. 3, 2001

(65) Prior Publication Data

US 2002/0139905 A1 Oct. 3, 2002

(51) Int. Cl.[7] .............................................. F16M 11/00
(52) U.S. Cl. ....................... 248/407; 248/408; 280/283; 297/215.13
(58) Field of Search ........................... 248/125.8, 125.2, 248/408, 188.5, 188.2, 407, 409, 404; 297/215.13, 209, 315, 198; 280/283, 600

(56) References Cited

U.S. PATENT DOCUMENTS

| | | | | |
|---|---|---|---|---|
| 510,993 A | | 12/1893 | Riess ........................... 248/409 |
| 617,500 A | | 1/1899 | Ehling ......................... 403/106 |
| 979,483 A | | 12/1910 | Harley ......................... 280/283 |
| 2,623,573 A | | 12/1952 | Gaetano ....................... 280/283 |
| 2,644,504 A | | 7/1953 | Vick ............................ 403/107 |
| 3,572,621 A | | 3/1971 | Whitten ....................... 248/548 |
| 4,150,851 A | * | 4/1979 | Cienfuegos .................. 297/195 |
| 4,182,508 A | | 1/1980 | Kallai et al. ................. 267/132 |
| 4,884,842 A | | 12/1989 | Finkelstein .................. 297/331 |
| 5,044,592 A | * | 9/1991 | Cienfuegos .................. 248/408 |
| 5,062,617 A | | 11/1991 | Campbell ..................... 267/132 |
| 5,344,170 A | | 9/1994 | Ochoa .......................... 280/283 |
| 5,370,351 A | * | 12/1994 | Chen ............................ 248/600 |
| 5,382,039 A | | 1/1995 | Hawker ........................ 248/600 |
| 5,551,753 A | * | 9/1996 | Glockl .......................... 297/314 |
| 5,927,738 A | | 7/1999 | Kesinger ...................... 280/220 |
| 6,202,971 B1 | | 3/2001 | Duncan ........................ 248/407 |
| 6,354,557 B1 | * | 3/2002 | Walsh .......................... 248/600 |

* cited by examiner

Primary Examiner—Leslie A. Braun
Assistant Examiner—Amy J. Sterling

(57) ABSTRACT

An adjustable, telescoping seat support with suspension that allows the height of a bicycle seat to be adjusted to a number of seat height positions safely while bicycle is in motion. An elongated tubular seat post is clamped to a bicycle frame in a stationary position. A bicycle seat is attached to an end of a tubular seat holder that is slidably posited over the stationary tubular seat post. The tubular seat holder has a coil spring on it that would provide suspension. A coil spring placed inside the tubular seat holder provides an extending force on the tubular seat post and the tubular seat holder such that the seat support is capable of extending to a raised seat position and compressing to a lowered seat position. The seat is locked into raised and lowered seat positions by a plunger locking portion that is attached to the elongated tubular seat holder and which remains at a fixed position relative to the seal for all seat height positions.

12 Claims, 4 Drawing Sheets

FIG. 3A    FIG. 3B

ADJUSTABLE HEIGHT SEAT SUPPORT WITH SUSPENSION

DESCRIPTION

1. Field of the Invention

This invention relates generally to seat supports for vehicles. More particularly, it relates to adjustable height seat supports for bicycles.

2. Background Art

Virtually all bicycles have adjustable seat posts for adjusting the bicycle seat to the rider's desired position. Generally, seat posts slide inside the upright seat post receiving shaft of the bicycle frame and are locked into position with a clamp. It is essential to fix the seat in the proper position, in which maximum pedal leverage and energy efficiency are attained. Lower positions place excessive stress on the knees, and higher positions cause the rider to rock from side to side to reach the bottom of the pedal stroke, causing lower back strain.

Experienced bicycle riders change their body position based on terrain and road configuration, and often need additional seat heights for their different positions. For example, on steep descents, the rider needs a lower center of gravity to keep the back of the bicycle on the ground. Currently, when reaching a hill, the rider must stop the bicycle, loosen a clamp, change the seat height, and then tighten the clamp. This process is repeated whenever a seat height change is required. In addition to being time consuming, changing the seat height adds unnecessary and disruptive breaks to the ride.

In the U.S. Pat. No. 5,382,039, issued to Hawker, a spring-loaded seat support is described. The seat support disclosed by Hawker is adaptable to a bicycle frame and allows the bicycle seat to move up or down. However, the seat support does not provide a way to position and lock a bicycle seat into up or down positions, but rather serves as a shock absorbing seat support.

U.S. Pat. No. 510,993, issued to Riess, describes a spring-loaded seat support mechanism used to raise a seat from an initial depressed position. Before mounting the bicycle, the rider must manually adjust the seat to the lower position. The seat then automatically rises to the preferred height when the rider exerts pressure on the seat. Because the seat mechanism only works in one direction, it is not very useful for riders needing to raise and lower the seat without stopping the bicycle.

U.S. Pat. No. 2,644,504, issued to Vick, discloses a bicycle seat adjusting device that enables a rider to adjust the seat in both directions while riding. The device is relatively large, has many working parts and would be difficult to manufacture or fix. In addition, the device requires a polygonal seat post, rather than a standard cylindrical seat post.

An adjustable seat support that is capable of adjusting a seat height while a bicycle is in motion has been described in U.S. Pat. No. 4,150,851, issued to Cienfuegos. The seat support described is not readily transferable from one bicycle to another because the mechanism for adjusting the seat height is an integral part of the bicycle frame itself. In a later patent issued to Cienfuegos. U.S. Pat. No. 5,044,592, this problem is overcome with an independent seat replacement unit that consolidates all of the parts of the seat support. However, this design places the locking and positioning portion of the seat support at a position near the horizontal portion of the bicycle frame. Mountain bicycles are designed with low frames and long seat posts, such that there is significant distance between the horizontal portion of the bicycle frame and the bicycle seat. A locking and positioning portion of a seat support system attached near the horizontal frame portion of the bicycle can be very difficult for the rider to reach while the bicycle is in motion and may cause the rider to lose balance while attempting to change the seat position. Further, since the locking and positioning mechanism changes its location relative to the rider with each new seat position, the rider will have to search for location of the locking and positioning mechanism while riding, again making the seat adjustment procedure unsafe. Also, the seat support device described in U.S. Pat. No. 5,044,592 extends far into the upright seat post receiving shaft of the bicycle frame, which is not possible with all bicycle frame designs.

There are no existing patents that combined an adjustable seat post with suspension.

None of the prior art devices meets the requirements of adaptability, portability, and ease of use, wherein the seat support has a locking and positioning portion that is independent of the bicycle frame and remains in a constant, easily reachable position relative to the bicycle seat. Therefore, there is still need for a commercially viable option that satisfies the stated requirements.

OBJECTS AND ADVANTAGES

Accordingly, it is a primary object of the present invention to provide an adjustable, telescoping seat support with a slidable, positioning tubular seat holder that moves up and down on a tubular seat post that is fixed to a bicycle frame. A bicycle seat that is attached to the slidable, positioning tubular seat holder is adjusted and locked in various height positions by a locking mechanism positioned substantially close to the attached bicycle seat. The present invention is well adapted for mountain bicycles, in which the seat is substantially higher than a horizontal cross bar portion of the bicycle frame.

It is a further object of the invention to provide an adjustable seat support that is not an integral part of the bicycle frame and that can easily be transferred from one bicycle to, another.

It is an additional object of the invention to provide an adjustable seat support with a small number of predetermined seat height positions, whereby the rider can switch quickly and easily between the predetermined seat height positions while riding.

It is another object of the present invention to provide a simple and adjustable seat support. wherein all of the adjustable and moving parts of the seat support are external to the bicycle frame, making repairs and maintenance to the seat support easier and less expensive.

It is a further object of the present invention to provide a seat support that is small and compact and that needs to be inserted only a short distance into the upright seat post receiving shaft of the bicycle frame in order to be safely secured to the bicycle frame.

It is further object of the invention to provide a seat support that has shock absorbing for the rider.

Lastly, it is an object of the present invention to provide an adjustable seat support for bicycles that is readily adapted to most standard mountain bicycle frames.

SUMMARY

These objects and advantages are attained by providing an adjustable, telescoping seat support with suspension for attaching a seat, wherein an elongated tubular seat holder slidably moves up and down over an elongated tubular seat post. A positioning and locking portion are configured on the tubular seat holder. Because the positioning and locking portion of the seat support moves up and down with the seat, it remains within reach of a rider at a constant distance, regardless of the seat height position.

The telescoping action of the seat support is preferably provided by a coil spring positioned inside the tubular seat holder which provides an extending force on the inner stationary seat post and the tubular seat holder such that they tend to extend in a telescoping fashion in the absence of a compressing force or a locking mechanism. A downward force applied to the elongated tubular seat holder through an attached seat, wherein the downward force is sufficient to overcome the extending force of the spring, will lower the seat position. The position of the attached seat can then be fixed in a preferred position with a lock. Releasing the lock will allow the seat to rise due to the extending force provided by the spring.

In the most preferred embodiment of the current invention, the locking and positing portion of the seat support is a plunger locking and positioning portion. In the plunger locking and positing portion, there is a plunger attached to the elongated tubular seat holder in a direction substantially normal to the outer wall of the elongated tubular seat holder, and which extends through the wall of the elongated tubular seat holder through a plunger hole. The elongated tubular seat post has several plunger receptacles on the outer wall for receiving the plunger at different seat heights and locking the seat into a plurality of seat height positions. Preferably, the plunger is a spring-actuated plunger such that when the plunger is pulled in an outward direction, the elongated tubular seat holder is capable of sliding up or down over the outside wall of the elongated tubular seat post. Releasing the plunger then allows it to fit into one of the plunger receptacles and thus locks the seat into a new position.

In the most preferred embodiment of the seat support, the locking and positioning portion also includes a positioning stop that extends from an inner wall of the elongated tubular seat holder and fits into an elongated slot grooved in the outer surface of the elongated tubular seat post and extending up and down the seat post in the elongated direction. The positioning stop and the slot serve to limit the rotational position of the tubular seat holder between seat height positions during adjustment, and serve to define the upper and lower limit of the seat height adjustments. In a particular embodiment, the seat support is configured to have two plunger receptacles that correspond to these upper and lower limits.

BRIEF DESCRIPTION OF THE FIGURES

FIG. 3A is a rear plan view of the elongated seat post member of FIGS. 1A–1B.

FIG. 3B is a front plan view of the elongated seat post member of FIGS. 1A–1B.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figures 1A, 1B:
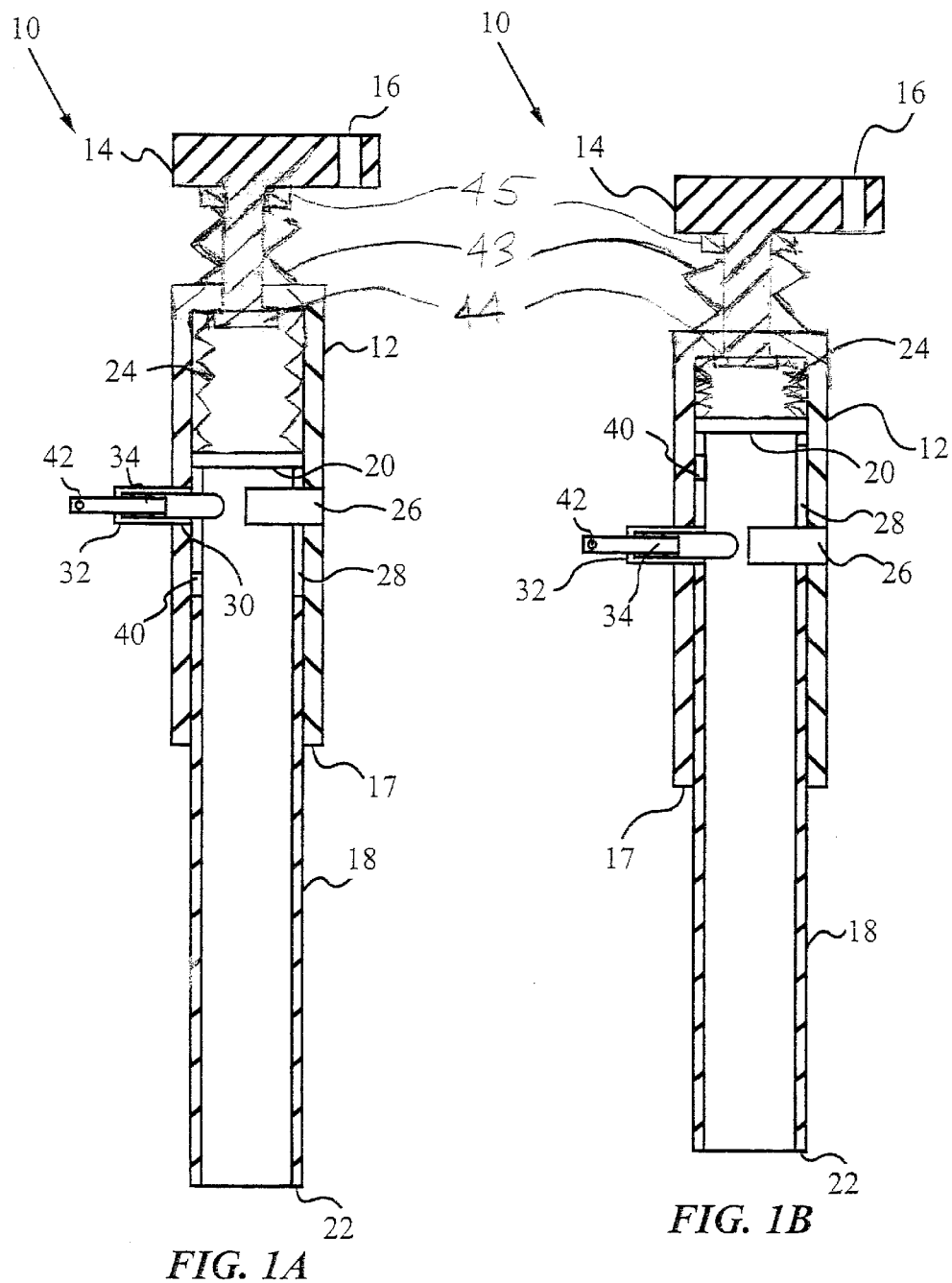
FIG. 1A is a side cross-sectional view of a preferred embodiment of the adjustable, telescoping seat support of the present invention, in the highest position.
FIG. 1B is a side cross-sectional view of the adjustable, telescoping seat support with suspension of FIG. IA, in the lowest position.

A preferred embodiment of the invention is shown in FIGS. 1A–2B. A telescoping, adjustable seat support with suspension 10 is positioned between a vehicle frame and a seat for adjusting the height of the seat above the vehicle frame. In this embodiment, only two heights are possible, but any number of heights may be accommodated by the present invention. FIG. 1A shows seat support 10 in its highest position, and FIG. 1B shows seat support 10 in its lowest position.

Figures 2A, 2B:
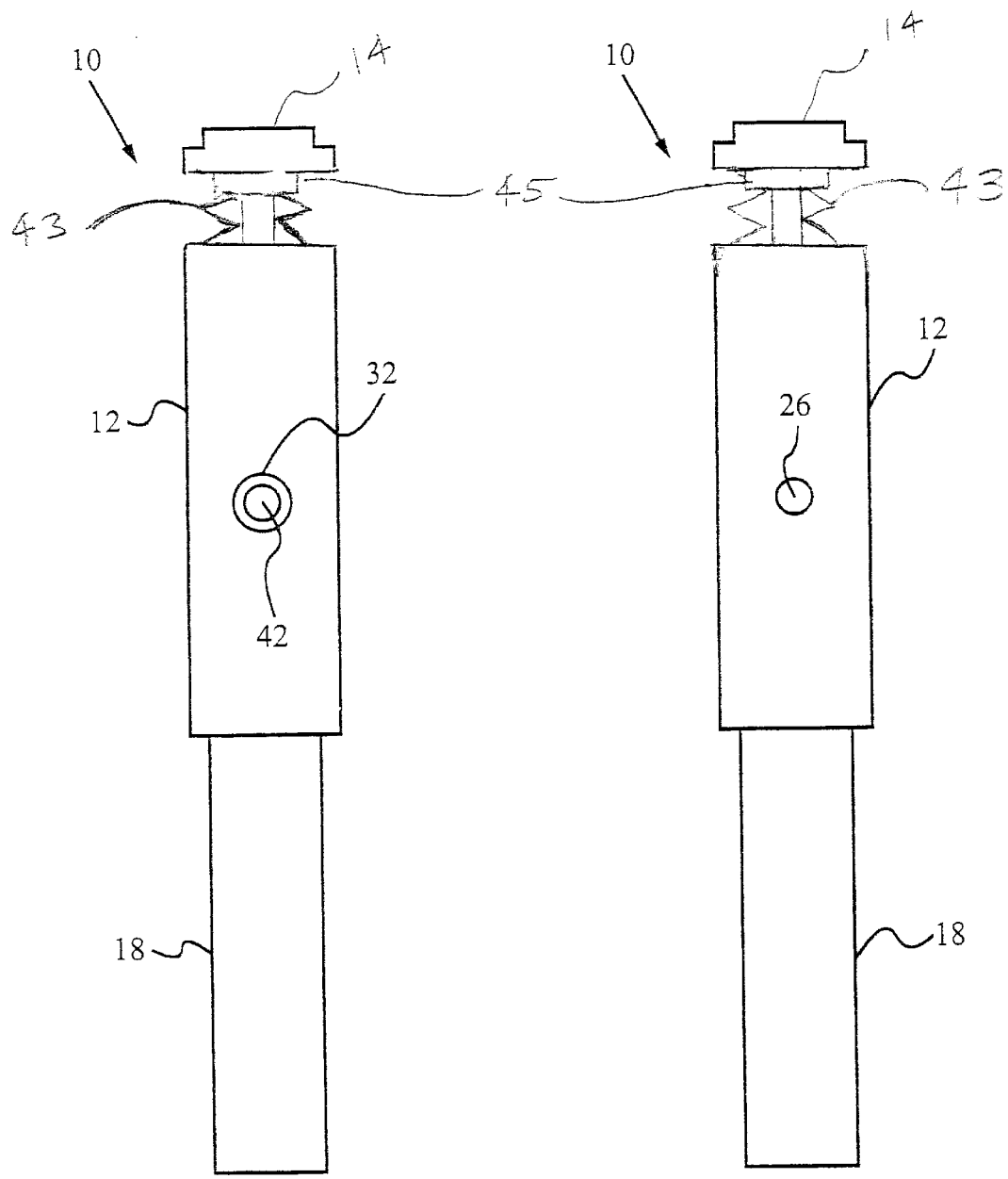
FIG. 2A is a front plan view of the adjustable, telescoping seat support with suspension of FIG. 1A.
FIG. 2B is a rear plan view of the adjustable, telescoping seat support with suspension of FIG. 1A.

FIG. 2A shows a front plan view of the seat support 10, and FIG. 2B shows a rear plan view of the seat support 10. Seat support 10 is formed from an elongated seat holder member 12 positioned around an elongated seat post member 18. The elongated seat holder member 12 and elongated seat post member 18 are tubular post members. Seat holder 12 has a seat end 14 and an open post end 17. A first spring stop is fixed inside seat holder 12 substantially near seat end 14. In the embodiment of FIGS. 1A–1B, having seat end 14 closed provides the spring stop. Attached to seat end 14 is seat attaching means 16. In FIGS. 1A–1B, seat attaching means 16 is shown as a screw hole; a screw is inserted through this hole and into a seat to attach the seat to seat end 14. Any other attaching means may be used, and attaching means 16 can also be a separate structure fixed to seat holder 12. Seat post 18 has a holder end 20 inserted into post end 17 of seat holder 12, and a second spring stop inside seat post 18 substantially near holder end 20. Similar to the first spring stop, the second spring stop may be provided by having holder end 20 closed. Seat post 18 also has a frame end 22 for inserting into a vehicle frame. Seat post 18 is clamped into a vehicle frame and remains fixed with respect to the vehicle frame. while seat holder 12 moves to raise and lower the seat.

A coil spring member 24 is positioned inside seat holder 12 between the first spring stop at seat end 14 of seat holder 12 and the second spring stop at holder end 20 of seat post 18. Spring 24 acts to push seat holder 12 and seat post 18 away from each other, thereby raising the seat. When the seat is raised, seat post 18 is said to move in the elongation direction. The stiffness of coil spring 24 is such that, for any extension of the spring, a rider can easily compress the spring by sitting on the seat. When the seat is lowered, seat post 18 is said to be moved in a compression direction. In the seat support device of the current invention, in the absence of a downward force, spring 24 exerts a force on seat post 18 that is sufficient to extend seat support 10 in the elongation direction and thus raise the seat.

In the preferred embodiment of the invention the seat is attached to 14. 14 is positioned into 12 and is held in place by a snap ring or equivalent 44. A coil spring 43 is between 14 and 12 that extends the seat upward. Therefore spring 43 acts as shock absorber when the rider is sitting on the seat. The design can include a nut 45 located above the coil spring 43 that can change the compression rate of the spring to adjust for different weight riders or differ suspension rates. Rotation between 14 and 12 will be prevented by either keyway on item 14 and pin on item 12 or the area under 14 located between 45 and 44 to be non-cylindrical.

Figure 4A:
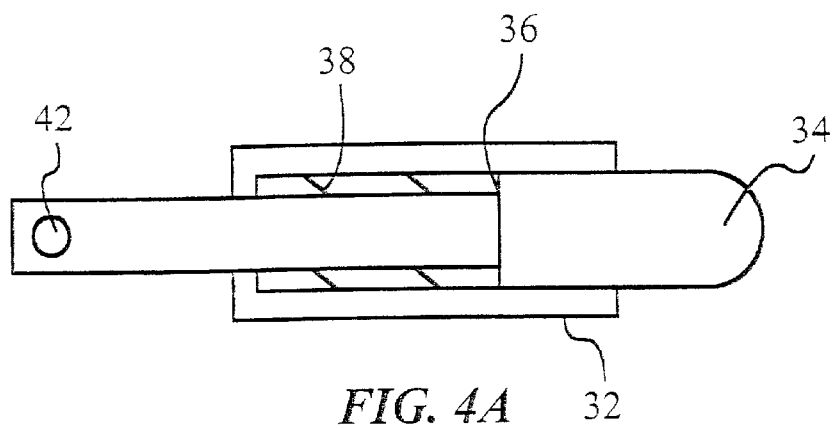
FIG. 4A is a side cross-sectional view of the plunger housing and movable plunger of the present invention, with the movable plunger in the locking position.
Figure 4B:
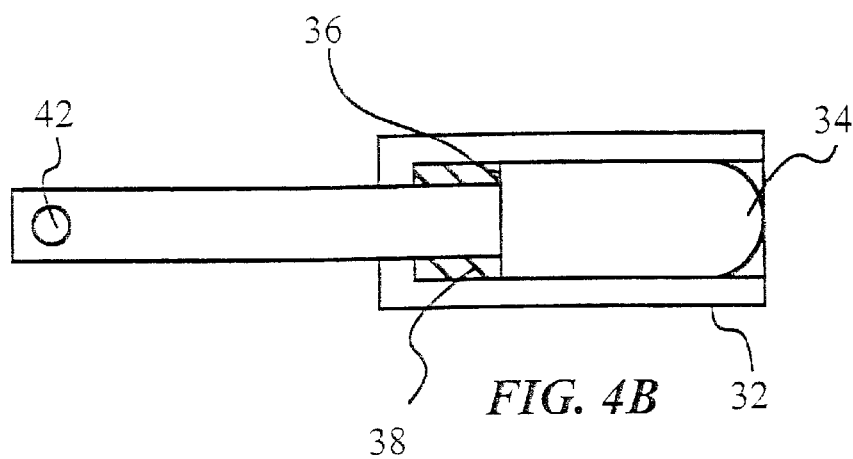
FIG. 4B is a side cross-sectional view of the plunger housing and movable plunger of the present invention, with the movable plunger in the releasing position.

Seat support 10 fixes the seat in a plurality of seat height positions with movable plunger 34. Movable plunger 34 is movably fixed to seat holder 12 at a plunger hole 30. Seat post 18 also contains a plurality of longitudinally spaced plunger receptacles 40. In the preferred embodiment, plunger receptacles 40 are holes. When plunger 34 is positioned through both plunger hole 30 and one of plunger receptacles 40, seat holder 12 is locked in position. This is the locking position of plunger 34, shown in FIG. 4A. Plunger 34 is fixed to seat holder 12 by a plunger housing 32. Plunger 34 extends out of both ends of plunger housing 32. Fixed to plunger 34 is a plunger stop member 36. A plunger coil spring 38 is positioned inside plunger housing 32, between the back of plunger housing 32 and plunger stop member 36. Spring 38 acts to force plunger 34 through plunger hole 30 and into plunger receptacles 40, i.e. into its locking position. In its releasing position, shown in FIG. 4B, plunger 34 is removed from plunger receptacle 40. Plunger 34 is forced into its releasing position using a manually operable means. In the embodiment of FIGS. 1A–1B, the manually operable means is a handle 42 mounted on plunger 34. Many other manually operable means may be imagined, for example, a lever, a handle knob, or cable attached to plunger 34.

Figure 3C:
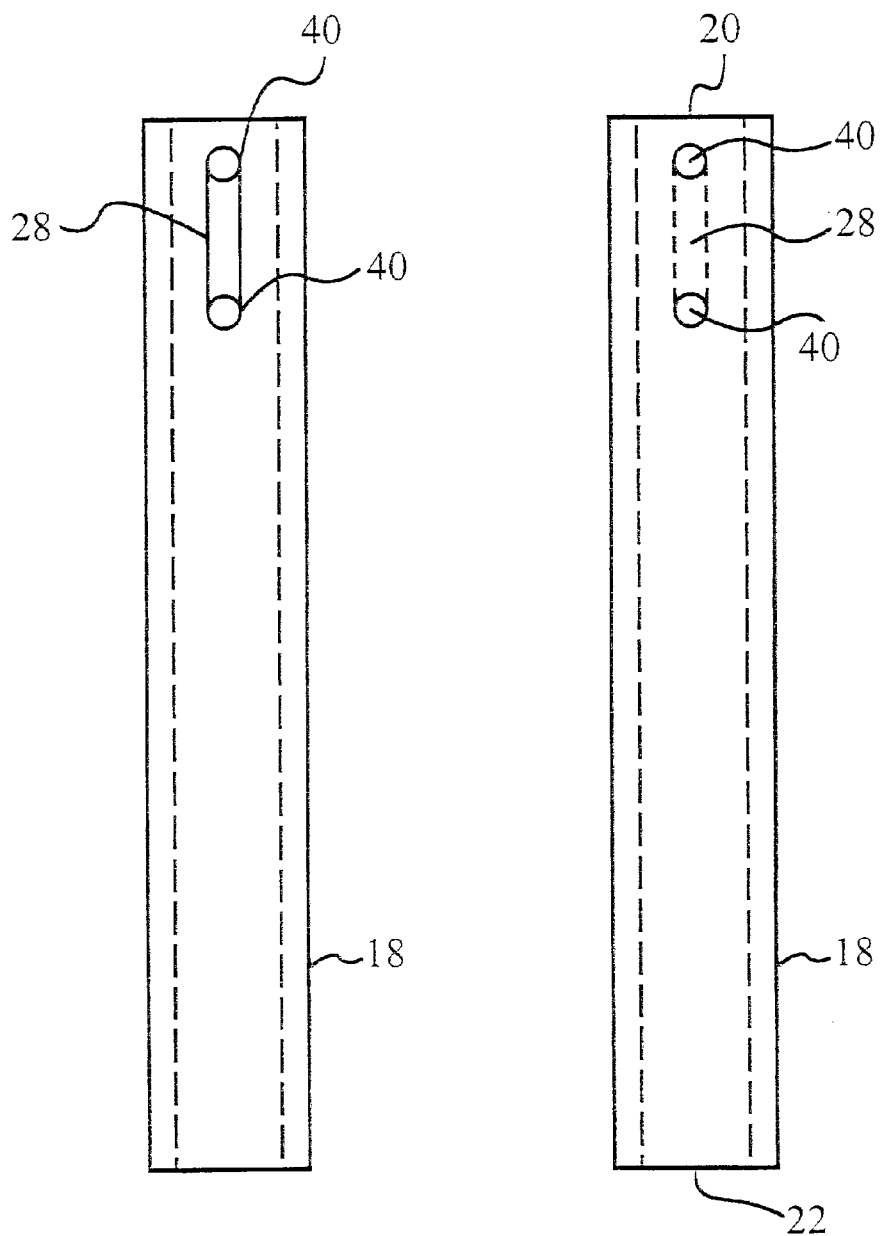
FIG. 3C is a top plan view of the elongated seat post member of FIGS. 1A–1B.
Figure 3C:
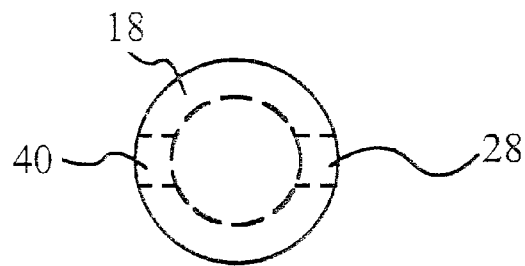

The preferred embodiment of seat support 10 also contains a means for fixing the rotational position of seat holder 12 during height adjustment. Seat post 18 has a slot 28 extending a portion of its length as shown in FIGS. 3A–3C. The distance between two ends of slots 28 is between 0.1 and 8 inches. A pin 26 is rigidly fixed to seat holder 12 and positioned to slide inside slot 28. In addition to limiting the rotational position of seat holder 12, slot 28 and pin 26 also provide stop means for defining the maximum and minimum seat height positions. When pin 26 slides to the bottom of slot 28, seat holder 12 cannot go lower without breaking pin 26. Similarly, maximum height is reached when pin 26 reaches the top of slot 28. Maximum seat height position is between 6 and 16 inches above the frame end 22, and the minimum seat height position is between 1 and 15 inches above the frame end 22.

In the preferred embodiment of the invention there are only two seat height positions corresponding to the maximum and minimum seat height positions. To lower the seat, the rider retracts plunger 34 from plunger receptacle 40. The rider's weight forces the seat to drop until pin 26 hits the bottom of slot 28. The rider releases plunger 34 into its extended position, and seat holder 12 is locked in position. To raise the seat, the rider shifts his weight to the pedals and retracts plunger 34. Spring 24 forces seat holder 12 away from seat post 18 until pin 26 hits the top of slot 28. The rider then releases plunger 34 into plunger receptacle 40 and safely rests his weight back on the seat. When multiple heights are desired. the rider will need to keep a portion of his weight on the seat to stop the seat movement at the desired height intermediate between the uppermost and lowermost heights. He then releases plunger 34 and moves the seat slightly until plunger 34 fits into an intermediate plunger receptacle 40.

It will be clear to one skilled in the art that the above embodiment may be altered in many ways without departing from the scope of the invention. For example, stop means can be provided by a cylinder placed inside seat holder 12 for holding seat end 14 of seat holder 12 at a fixed distance from holder end 20 of seat post 18. Also the spring may be configured with a dampening portion to reduce the rate at which the seat is raised from a lower to a higher position. Accordingly, the scope of the invention should be determined by the following claims and their legal equivalents.

What is claimed is:

1. An adjustable, telescoping seat support for adjusting a bicycle seat above a bicycle frame to a plurality of seat height positions, wherein said adjustable, telescoping seat support is a modular part of said bicycle frame, comprising:

a) an elongated seat holder member with an elongated outer seat member wall, a hollow interior portion, a seat end, and an open post end, said seat end having attaching means for attaching to said bicycle seat;

b) an elongated seat post member with an elongated outer seat holder wall and having a holder end slidably positioned inside said open post end of said elongated seat holder member and a frame end, said frame end for attaching to said bicycle frame;

c) means for providing and extending force to said elongated seat holder member and said elongated seat post member wherein said means for providing an extending force is positioned substantially inside said hollow interior portion of said elongated seat holder member and wherein said adjustable, telescoping seat support is capable of extending in an elongating direction to a maximum seat height position and collapsing in a compression direction to a minimum seat height position; and d) means for fixing said seat at said plurality of seat positions wherein said means for fixing said seat at said plurality of seat heights is attached to said elongated seat holder member and remains at a constant distance from said seat end in all of said plurality of seat height positions.

2. The adjustable, telescoping seat support of claim 1 wherein said elongated seat holder member and said elongated seat post member are tubular post members.

3. The adjustable, telescoping seat support of claim 1 wherein said means for providing an extending force to said elongated seat holder member and said elongated seat post member comprises:

a) a coil spring member with a first end and a second end, wherein said coil spring member is positioned within said hollow interior portion of said elongated seat holder member, such that said coil spring expands in said elongation direction and compresses in said compression direction;

b) a first spring stop positioned within said elongated seat holder member, wherein said first spring stop is in communication with said first end of said coil spring member; and c) a second spring stop positioned near said holder end of said elongated seat post member, wherein said second spring stop is in communication with said second end of said coil spring member; thereby providing said extending force to said elongated seat holder member and said elongated seat post member.

4. The adjustable, telescoping seat support of claim 1 wherein said means for fixing said seat at said plurality of seat height positions comprises:

a) a plunger hole through said outer seat holder member wall into said hollow interior portion of said elongated seat holder member substantially near said post end;
b) a plurality of plunger receptacles in said outer seat post member wall of said elongated seat post member corresponding to said plurality of seat height positions;
c) a movable plunger sized to penetrate said plunger hole, wherein said movable plunger is capable of being moved to an outward releasing position and allowing said elongated seat holder member to be slidably moved in said elongation direction and said compression direction, and wherein said movable plunger is capable of being moved to an inward locking position with said movable plunger received in one of said plurality of plunger receptacles; and
d) a locking mechanism for holding said movable plunger in said locking position.

5. The adjustable, telescoping seat support of claim 4 wherein said locking mechanism comprises:
a) a plunger housing having an open front end and an open back end, said front end rigidly mounted to said elongated seat holder member, said movable plunger movably mounted in said plunger housing;
b) a plunger stop member rigidly mounted on said movable plunger;
c) a plunger spring mounted in said plunger housing, said plunger spring positioned between said plunger stop member and said back end of said plunger housing for biasing said movable plunger toward said plunger hole in said elongated seat holder member; and
d) manually operable means for retracting said movable plunger from said plunger receptacles in said elongated seat post member.

6. The adjustable, telescoping seat support of claim 5 wherein said manually operable means is selected from the group consisting of a handle knob, a cable, and a lever.

7. The adjustable, telescoping seat support of claim 4 further comprising:
a) a slot with a first slot end and a second slot end positioned in said outer seat post member wall of said elongated seat post member, wherein said slot extend in said elongation direction and said compression direction; and
b) a pin rigidly fixed to said hollow interior portion of said elongated seat holder member, said pin passing into said slot and sliding between said first end of said slot and said second end of said slot defining a range of seat height positions between said maximum seat height position and said minimum seat height position.

8. The adjustable, telescoping seat support of claim 7 wherein said maximum seat height position is between 6 and 16 inches above said frame end and said minimum seat height position is between 1 and 15 inches above said frame end.

9. The adjustable, telescoping seat support of claim 7 wherein the distance between said first end of said slot and said second end of said slot is between 0.1 and 8 inches.

10. The adjustable, telescoping seat support of claim 2 wherein said frame end of said elongated seat post member is sized for fitting into a standard-diameter bicycle frame.

11. The adjustable telescoping seat support claim 1, wherein said open post end is a slip fit.

12. The adjustable, telescoping seat support of claim 1, further comprising a spring for shock absorption, wherein said spring is placed in between said open post end and said seat end.

* * * * *